Aug. 2, 1960

J. L. BELLAMY ET AL 2,947,955

MULTI-CHANNEL ROTARY JOINT

Filed June 13, 1957

INVENTOR.
JACK L. BELLAMY &
GLENN A. WALTERS
BY
John F Lawler
ATTORNEY

Aug. 2, 1960   J. L. BELLAMY ET AL   2,947,955
MULTI-CHANNEL ROTARY JOINT
Filed June 13, 1957   4 Sheets-Sheet 3

INVENTOR.
JACK L. BELLAMY &
GLENN A. WALTERS
BY
John F. Lawler
ATTORNEY

United States Patent Office 2,947,955
Patented Aug. 2, 1960

2,947,955

MULTI-CHANNEL ROTARY JOINT

Jack L. Bellamy, Mountain View, and Glenn A. Walters, Atherton, Calif., assignors to Textron Inc., Belmont, Calif., a corporation of Rhode Island Filed June 13, 1957, Ser. No. 665,437

6 Claims. (Cl. 333—98)

This invention relates to microwave rotary or swivel joints and more particularly to a rotary joint through which two or more microwave signals are transmitted simultaneously and without interference.

In certain applications, two or more wave guide transmission lines are required to carry microwave intelligence to and from a rotatable element, such as a common mounting platform for two antennas, and each wave quide must include a swivel joint to accommodate relative rotary rotary movement between parts of the guide. The use of a separate rotary joint for each wave guide, however, complicates the feed system because each joint must be mounted to swivel about a common axis of rotation. Furthermore, space and weight limitations in some applications, such as in air-borne microwave systems, dictate the need for a lightweight, compact joint design that is not satisfied by use of a separate swivel mechanism for each transmission line.

Accordingly, an object of this invention is the provision of a lightweight, compact mechanism that rotationally intercouples two or more microwave transmission lines.

Another object is the provision of a multi-channel rotary joint through which more than one wave can be transmitted at the same time.

A further object is the provision of a single rotary joint which is capable of rotating two or more separate wave guide lines about a common axis of rotation.

A more specific object is to provide a multi-channel rotary wave guide coupling that is contained in one housing and thereby occupies a minimum of space.

Another specific object is the provision of a vertebrae-type rotary joint having three microwave transmission channels for rotationally intercoupling three separate wave guides.

Another object is the provision of a rotary joint made up of a plurality of relatively rotatable disc members which are axially aligned by bearing means located along the common axis of rotation of the members.

These and other objects of our invention will become apparent from the following description of preferred embodiments thereof, reference being had to the accompanying drawings.

Briefly, the rotary joint of the present invention comprises a plurality of disc members arranged for rotative movement relative to one another about a common axis. In a preferred embodiment, each member has three wave transmitting apertures, offset from the axis of rotation, through which microwave energy is transmitted by three wave guides connected to opposite end members of the joint. While the invention is described in conjunction with a three-channel joint, it will be understood from the following description that two, four or more channels may be formed in the joint without departing from the principle of the invention. Gear means interlinking the several members of the joint divide the total angle of twist of one end member relative to the opposite end member, between the intermediate members so that the rotation over the entire joint is made in small steps between the members, and the wave transmitting apertures in one member are angularly offset by a few degrees from the corresponding apertures in the adjacent member. Progressive angular displacement of the members produces the effect of simultaneously bending or curving three wave guides around a common axis, that is, the axis of rotation of the joint. The gradual bending of each wave guide channel minimizes reflection losses, and each channel transmits microwave energy independently of and without interference with the other channels.

Figure 1:
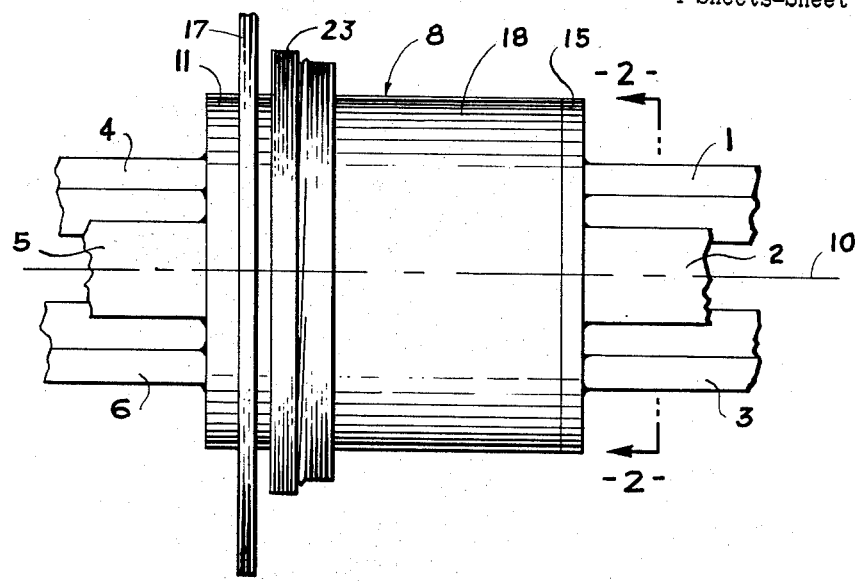
Figure 1 is an elevation of a rotary joint embodying the present invention and rotationally intercoupling three separate wave guides.

Referring to Figure 1, three wave guides, 1, 2 and 3 are rotatively coupled respectively to wave guides 4, 5 and 6 by a rotary joint 8 arranged to rotate within limits about an axis 10 through the center of the joint. Wave guides 1, 2 and 3 may, for example, be connected to microwave transmitting and receiving apparatus, not shown, and wave guides 4, 5 and 6 may be connected to a microwave antenna or antennas, not shown, which have an oscillating motion about the axis 10 as the antenna is swept from side to side for scanning purposes. The joint is constructed with three separate channels, and each channel is in effect, a section of wave guide which joins two other sections of wave guide to form a continuous transmission line. The three channels in the joint are caused to progressively bend simultaneously about the axis 10 as the joint rotates.

Figure 3:
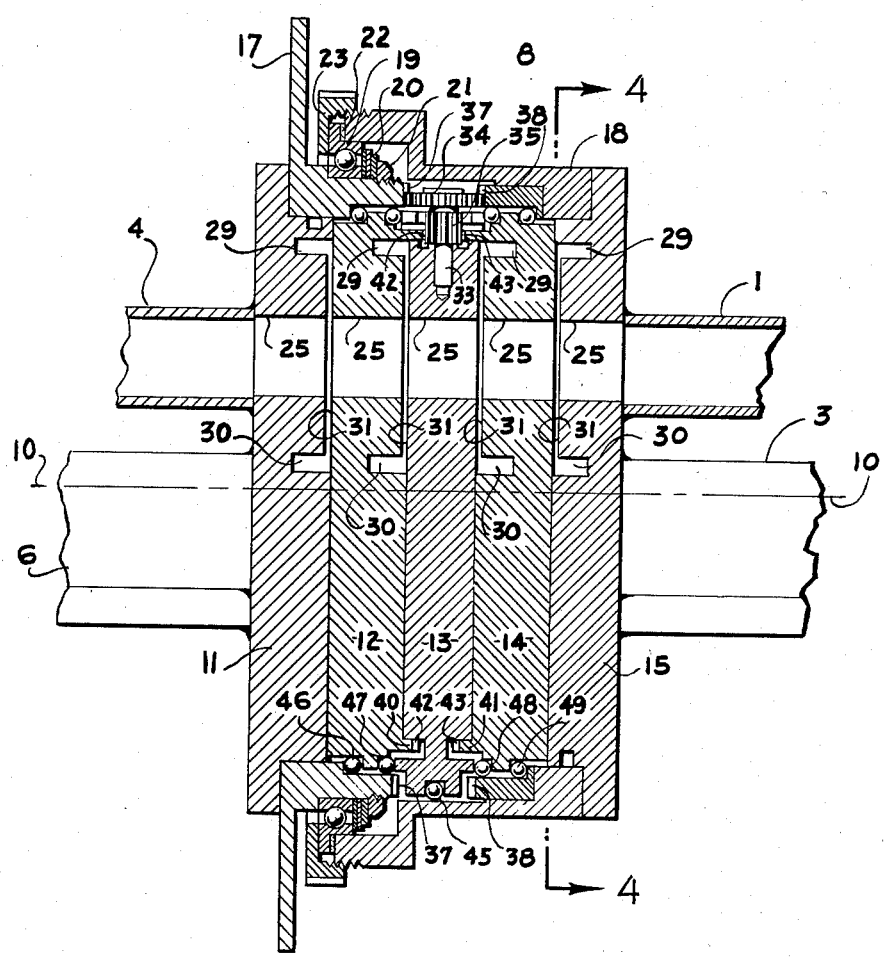
Figure 3 is an enlarged section through the center of the joint taken on line 3—3 of Figure 2.

The joint comprises wave guide members 11, 12, 13, 14 and 15 disposed in end-to-end axial alignment as shown in Figure 3. These five wave guide members are rotative relative to each other about their common axis 10; that is, either member 11 or member 15 is generally stationary, while the other end member is rotated or moved in an oscillatory twisting motion about its axis, in consequence of which members 12, 13 and 14 rotate or twist by intermediate amounts. The widths of intermediate members 12, 13 and 14 preferably are equal to one-quarter of the wave length of the transmitted wave, and end members 11 and 15 may be any desired thickness.

A mounting flange 17 is rigidly attached to end member 11 and cylindrical housing 18 is similarly secured to opposite end member 15. Flange 17 and housing 18 are rotatably connected by a ball bearing assembly 19, so that the joint is enclosed, and end members 11 and 15 are accurately axially aligned and axially spaced. A plurality of washers 20 seal the openings in the ball bearing assembly so that slightly elevated pressures can be maintained inside the wave guides, if desired, in accordance with conventional practice. A retaining nut 21 holds washers 20 and ball bearing assembly securely in place abutting a shoulder of flange 17, as shown. The outer race of ball bearing assembly 19 is held in position at the end of housing 18 by a gasket 22 and a retaining nut 23.

Figure 2:
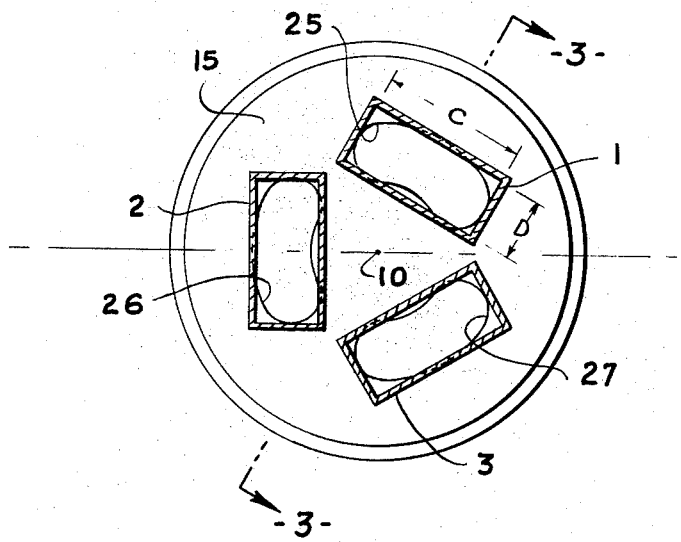
Figure 2 is an end view of the joint showing the transition from the rectangular wave guides to the apertures in the joint, the view being taken on line 2—2 of Figure 1.
Figure 4:
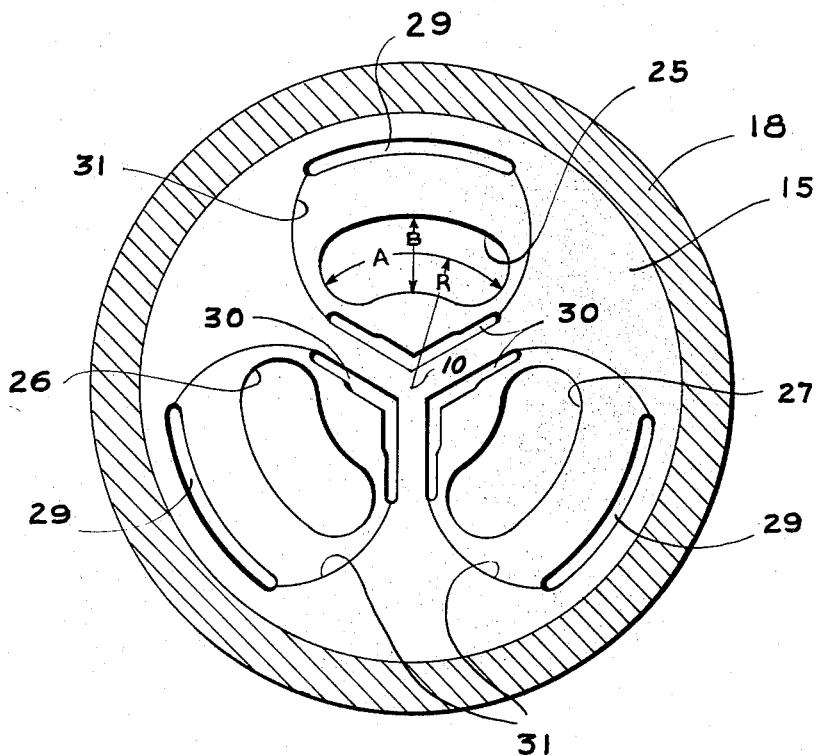
Figure 4 is a transverse section showing the arrangement of the apertures and the choke grooves on the junction face of one of the discs, the section being taken on line 4—4 of Figure 3.

Wave guide members 11, 12, 13, 14 and 15 preferably are disc-shaped, each having three apertures 25, 26 and 27 having cross-sectional dimensions corresponding to the internal dimensions of the connected wave guides, and being radially spaced from the rotational axis of the member and arcuately spaced from each other, see Figures 2 and 4. In the preferred embodiment of the joint, these apertures are curved along the wider or H-plane dimension of the wave guide, that is, along dimension A, have a radial width B in the E-plane, and have a mean radius R of aperture curvature measured from center or axis 10 of rotation of the disc member. In other words, each aperture is an opening or slot which is curved along an arc of a circle having a center coincident with the axis of rotation. The slot ends are also rounded or curved, as shown. The H-plane width A of the aperture preferably is equal to the internal width C of the coupled wave guide, see Figure 2, and the E-plane width B of the aperture equals the corresponding dimension D of the wave guide. By way of example, a disc member having a diameter of 2.90" and three apertures spaced 120° apart, each aperture having dimensions of $A=.50''$, $B=1.12''$ and $R=\frac{3}{4}''$, has been constructed and successfully tested. It will be understood that other shapes of apertures may be utilized without departing from the broad principle of the invention, and further, the apertures in a disc member may be located in different radial and angular positions in the member and need not be equally radially and arcuately spaced. However, the aperture size, shape and arrangement for all disc members must be the same to establish the proper wave transmitting relationship between apertures in one disc member with those in the other members.

In accordance with standard practice, choke grooves are formed in a face of disc members 11, 12, 14 and 15 at the four junctions of the members and adjacent each aperture, in order to minimize radiation losses at the junctions. These grooves preferably comprise an arcuate outer groove 29 between the aperture and the periphery of the member, and a V-shaped inner groove 30 between the aperture and the center of the member, both inner and outer choke grooves being in radial alignment with each aperture. A recess or cavity 31 in the face of the disc member around each aperture provides the necessary axial spacing between adjacent disc members to complete the choke. Since the plane of the E-field of microwave energy passing through each channel is generally radial, it is sufficient that grooves 29 and 30 be radially aligned with the corresponding aperture to maintain radiation losses at a minimum.

At one angular position of the disc members, when the angular displacement between the end members is zero, corresponding sides of apertures 25 are precisely aligned and parallel and longitudinal axes of wave guides 1 and 4 form a straight line intersecting the centers of apertures 25, as shown in the drawings. At other angular positions of the disc members, each successive aperture 25 is rotated about the axis 10 relative to the preceding aperture so that wave guide channel defined by the aperture walls is bent in steps and progressively along a helical curve. In a well designed joint of this type, the angle of twist between end members 11 and 15 may exceed 60° in either direction without producing unduly large reflections or standing waves in the wave guide. The three channels defined by apertures 25, 26 and 27 are bent simultaneously as the members rotate and independent channels for the transmission of microwave energy through the aligned disc members are thus provided.

Gear means interlinking the several disc members rotate the members through the proper angles as the end members are relatively rotated. A gear arrangement for accomplishing this is described in the co-pending application of Reginald T. Lamb, Serial Number 486,553, filed February 7, 1955, now abandoned, transferred by mesne assignments to the assignee of the instant application. This gearing is shown in the drawings and is described briefly hereinafter.

Radial pin 33 mounted in the periphery of center disc member 13 rotatively mounts a planetary gear 34 and a pinion 35, interconnected to rotate together about the axis of the pin. Teeth 37 and 38 on inner opposing faces of flange 17 and housing 18, respectively, comprise face gears which engage gear 34 so that whenever the end disc member 11 is rotated relative to end member 15, center member 13 is rotated exactly one-half the angular distance through which member 11 rotates. Crowns 40 and 41 on disc members 12 and 14, respectively, are formed with gear teeth 42 and 43, and constitute face gears which extend inwardly toward and engage opposite sides of pinion 35 so that intermediate members 12 and 14 are rotated simultaneously by the gear train when the end members are rotated relative to one another. The amount of angular rotation of these intermediate members is a predetermined fraction of the relative rotation between the center and end members, and is selected to provide optimum impedance characteristics in the joint. By way of example, the gear ratios between the second pair of face gears 42—43 and the pinion 35, are so related that the intermediate disc members 12 and 14 rotate relative to the center member 13 by sixty percent of the angular amount that end members 11 and 15 rotate relative to center member 13. Deviations from these gear ratios may be found desirable, and other optimum ratios may be determined experimentally.

Axial alignment of the several disc members is maintained by rows 46, 47, 48 and 49 of steel balls riding in appropriate grooves in the periphery of intermediate members 12 and 14 against adjacent surfaces of flange part 17 and housing 18, and center member 13 is similarly aligned by means of a series of balls 45 positioned between housing 18 and the periphery of the center member. These balls are inserted between these relatively rotating parts during assembly of the joint and permit the members to oscillate about the axis of rotation with a minimum of friction and without substantial deviation from true axial alignment of the several members.

It is apparent that the end members 11 and 15 and the intermediate disc members 12, 13 and 14 are free to rotate or oscillate relative to each other about axis 10, and each disc member is firmly held in fixed axial relationship with the other members. As end member 11 is rotated through a given angle relative to member 15, for example, 60°, member 14 rotates in the same direction through a smaller angle, say 12°. Center member 13 rotates 18° more than member 14 for a total angle of 30° relative to end member 15. The next intermediate member 12 advances 18° more than center member 13 for a total of 48° of rotation with respect to end member 15, and end member 11 is displaced 12° from member 12. Thus, the total angle of rotation of the joint is distributed over the several disc members and the apertures are progressively arcuately offset from corresponding adjacent apertures by an amount dependent upon the selected gear ratios to pass the microwave energy with minimum reflections.

While the joint has been described and shown herein as comprising two end members and three intermediate members, it will be understood that the joint can be made a greater number of intermediate members thereby permitting a greater angle of rotation by dividing the total angular displacement in smaller steps over the greater number of disc members. A smaller number of intermediate members may also be used if a smaller angle of rotation is desired.

Figure 5:
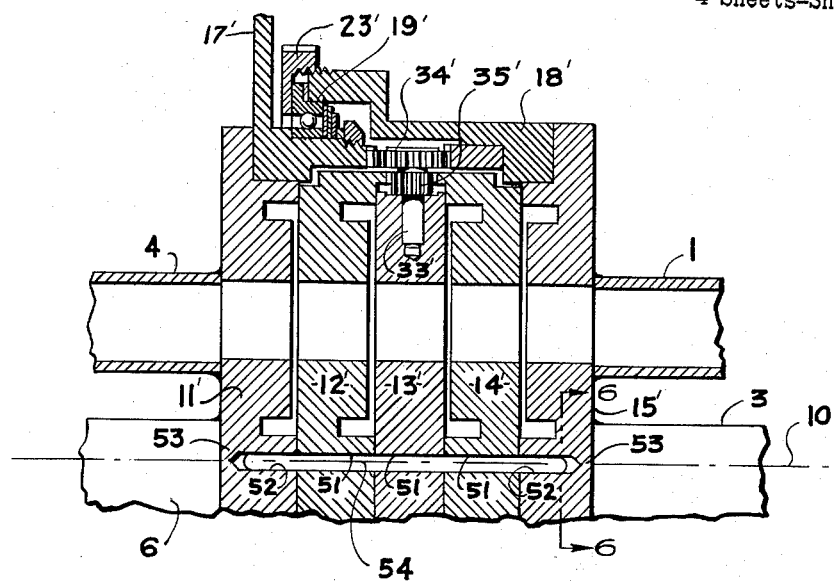
Figure 5 is a partial sectional view, similar to Figure 3, of a modified joint showing an axial bearing element at the centers of the disc members for maintaining axial alignment of the members.
Figure 6:
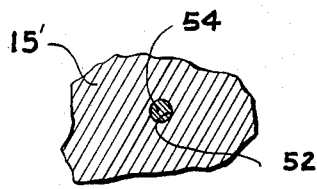
Figure 6 is a transverse section taken on line 6—6 of Figure 5.
Figure 7:
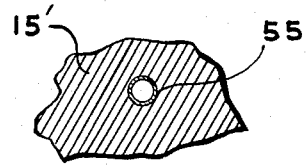
Figure 7 is a section similar to Figure 6 showing an alternate form of axial bearing.

The location of the wave guide channels with their respective axes offset from the axis of rotation of the joint permits the use of a modified alignment bearing for the several members. As shown in Figures 5 and 6, each of the intermediate disc members 12', 13' and 14' has a relatively small central opening or bore 51, in the order of ⅛" in diameter, formed coaxially of the axis of rotation 10, and end members 11' and 15' have blind central openings 52 aligned with these bores and closed at the outer ends by end walls 53. A pin 54 fits snugly in the bores 51 and in openings 52 for substantially the length of the joint. Because of the relatively small diameter of pin 54, the torque developed by the resistance between the pin and the surfaces of the disc bores is negligible and relatively free rotation of the members results. Positive engagement between elements of the gear linkage, which is substantially the same as that described above and therefore is not again described in detail, serves to accurately rotate the disc members and to maintain the fixed axial positions of the members. For this purpose, three gear assemblies, each consisting of a pin 33', planet gear 34' and pinion 35', are spaced 120° apart on the circumference of center member 13'. Pin 54 may be a solid bar, as shown in Figures 5 and 6, or may be tubular as indicated at 55 in Figure 7, with a slight increase in diameter. An advantage of the latter construction is that the pin is not only an alignment bearing but also is a central conduit through the joint which may be used for communication of fluid from one end of the joint to the other; the conduit 55 being suitably coupled and sealed to fluid lines, not shown, connected to the end members 11' and 15'.

Changes, modifications and improvements to the above described embodiment of the invention may be made by those skilled in the art without departing from the spirit and scope of the invention. Therefore, we do not wish the patent to be limited in any manner inconsistent with the invention as defined in the appended claims.

We claim:

1. A microwave rotary joint comprising a plurality of axially aligned wave guide members rotative relative to one another about their common axis, each of said members having at least two apertures radially spaced from said axis and arcuately spaced from each other, each aperture in one member being arranged to at least partially overlie a corresponding opening in the adjacent member, and means interlinking said members for successively rotating the members and for locating the apertures in said members at progressively different angles of rotation to produce the effect of at least two separate and bent wave guides.

2. A multi-channel microwave rotary joint, comprising a plurality of axially aligned wave guide members rotative relative to one another about their common axis, each of said members having a plurality of laterally spaced apertures radially spaced from said axis, the apertures in each member communicating with corresponding apertures in the adjacent member and forming independent longitudinal channels in the several members, and means interlinking said members for successively rotating the members through different angles and simultaneously bending said channels.

3. In a mechanism arranged to interconnect a first set of at least two wave guide sections, a series of axially aligned members rotative relative to each other about a common axis, each of said members having at least two apertures radially spaced from said axis, each aperture of one member overlying a corresponding aperture of the adjacent member and forming a wave guide providing electrical communication between a wave guide section in said first set with a wave guide section in said second set, and means interlinking said members and operable to effect relative rotation thereof to simultaneously produce a bending of the wave guides formed by said members in response to relative rotation of said interconnected sets of wave guide sections.

4. In a microwave energy transmission system having at least two juxtaposed wave guides, a mechanism adapted to interconnect first and second sections of said wave guides, said mechanism comprising a series of adjacent axially aligned members arranged for relative rotation about their common axis, each member having at least two wave transmitting apertures with centers offset from said axis and communicating with corresponding apertures in adjacent members to define two channels, and means interlinking said members and operable to effect relative rotation thereof to produce the effect of bending said two channels in response to relative rotation of said first and second sections thereof.

5. The mechanism according to claim 4 in which each of said apertures is curved and has a center of curvature coincident with said axis.

6. A multi-channel waveguide rotary joint, comprising two discoid end parts and a plurality of discoid intermediate parts all mounted in contiguous axial alinement, one end part and each intermediate part being rotative relative to the other end part about their common axis, each of said parts having therethrough a plurality of non-axial apertures similar in number and position to the apertures of the other parts so that all of said apertures can be brought into simultaneous linear alinement to define a plurality of parallel waveguides, and mechanism for rotating said intermediate parts by different lesser angular amounts upon rotation of said one end part part relative to the other to produce a gradual, step-wise bending of each of said waveguides.

References Cited in the file of this patent

UNITED STATES PATENTS

| | | |
|---|---|---|
| 2,423,130 | Tyrrell | July 1, 1947 |
| 2,521,818 | Aron et al. | Sept. 12, 1950 |
| 2,529,381 | Frear | Nov. 7, 1950 |

OTHER REFERENCES

Markus: Production Techniques, Electronics, December 1956, pages 228 and 230.